United States Patent
Jönsson

[11] Patent Number: 6,155,754
[45] Date of Patent: Dec. 5, 2000

[54] FASTENING ARRANGEMENT FOR CUTTING INSERTS

[75] Inventor: Ivan Jönsson, Sandviken, Sweden

[73] Assignee: Sandvik AB, Sandviken, Sweden

[21] Appl. No.: 08/894,409

[22] PCT Filed: Feb. 26, 1996

[86] PCT No.: PCT/SE96/00250

§ 371 Date: Aug. 20, 1997

§ 102(e) Date: Aug. 20, 1997

[87] PCT Pub. No.: WO96/26802

PCT Pub. Date: Sep. 6, 1996

[30] Foreign Application Priority Data

Feb. 27, 1995 [SE] Sweden .................................. 9500707

[51] Int. Cl.[7] .................................................. B23B 27/16
[52] U.S. Cl. ........................ 407/103; 407/105; 407/107
[58] Field of Search ................................. 407/103, 104, 407/105, 101, 107, 66

[56] References Cited

U.S. PATENT DOCUMENTS

| | | | |
|---|---|---|---|
| 1,648,380 | 11/1927 | Dover | 407/102 X |
| 2,475,784 | 7/1949 | Grove | 407/102 X |
| 2,877,535 | 3/1959 | Williams | 407/103 X |
| 3,341,921 | 9/1967 | Weller et al. . | |
| 3,525,136 | 8/1970 | Crosby | 407/105 |
| 3,913,197 | 10/1975 | Wolf . | |
| 3,925,868 | 12/1975 | Singh | 407/104 |
| 4,283,163 | 8/1981 | Grafe et al. . | |
| 4,397,592 | 8/1983 | Erickson | 407/105 |
| 4,427,322 | 1/1984 | Kroll | 407/105 |
| 4,430,031 | 2/1984 | Hellstrom | 407/104 |
| 4,615,650 | 10/1986 | Hunt . | |
| 4,852,622 | 8/1989 | Eriksson | 407/103 X |
| 5,199,828 | 4/1993 | Forsberg et al. | 407/105 X |
| 5,417,694 | 5/1995 | Marik et al. | 606/88 |

FOREIGN PATENT DOCUMENTS

| | | |
|---|---|---|
| 0 051 775 | 10/1981 | European Pat. Off. . |
| 31 18 467 | 11/1982 | Germany . |
| 447879 | 12/1986 | Sweden . |

Primary Examiner—Henry W. H. Tsai
Attorney, Agent, or Firm—Burns, Doane, Swecker & Mathis, L.L.P.

[57] ABSTRACT

A device for the clamping of cutting inserts for cutting metal machining. The device includes a mainly straight locking screw, which is threaded through a through center hole in the cutting insert and is threaded firmly into a threaded boring in a cutting insert seat intended for accommodating the cutting insert. The cutting insert seat is provided in a cutting insert holder body, such as a turning bar, a milling cutter body or a drilling tool. The head of the locking screw is chamfered in at least two places to enable the cutting insert to be stepped over the locking screw head when the screw is screwed upwards a predetermined number of revolutions. Thus, the present invention eliminates the need for the screw having to be detached from the threaded boring in order to remove the cutting insert.

9 Claims, 4 Drawing Sheets

FASTENING ARRANGEMENT FOR CUTTING INSERTS

TECHNICAL FIELD

The present invention relates to a clamping arrangement for cutting inserts for cutting machining, particularly of metals. More specifically, the invention relates to such an arrangement including a locking screw, the head of which has been chamfered off at at least two places to enable the cutting insert to be removed over the locking screw after the screw has been screwed up only a small number of revolutions, without being detached from the threaded hole in the cutting insert seat.

BACKGROUND OF THE INVENTION

Cutting inserts in modern cutting tools, such as in turning bars and different milling cutter bodies, are preferably of the so called indexable cutting insert type, i.e. they are not irreversibly fastened in the holder, but can be detached and turned in order to indexate a new operative cutting edge, when the preceding edge has attained a certain degree of wear, or is replaced when all cutting edges have been worn out. In order to enable this indexating or this replacement, the indexable cutting insert is clamped in the holder by a screw through a hole in the very cutting insert, a detachable clamp presses upon the upper side of the cutting insert, and a locking pin presses against the hole wall of the cutting insert, etc. The most common clamping arrangement would however be a locking screw, which is threaded through a center hole in the indexable cutting insert and is screwed firmly into a threaded hole of the cutting insert seat of the holder. A drawback with this device is however that the screw must be wholly unscrewed and be detached from the holder, when it is time for a replacement of the cutting insert. This may be very inconvenient and time consuming, partly because it can comprise a great number of replacements of cutting inserts, partly because the screws are small and unmanageable, which entails that one easily drops them and that they easily get lost.

A number of solutions have been suggested to overcome the drawbacks with loose screws when replacing cutting inserts. Hence, there are locking screws disclosed in U.S. Pat. No. 3,341,921, SE-C-447 879, EP-A-51 775 and DE-A-3 118 467, all at which are based on the principle, that the center hole of the cutting insert is as large as to permit the wholly round screw head to pass through it. When the cutting insert is clamped, only a part of of the lower side of the head presses against the corresponding circumference section of the hole surface. Although these designs usually function satisfactorily, they are impaired with certain drawbacks. Thus, as mentioned, the clamping force is concentrated to a short, theoretically seen point or line-shaped abutment area between the screw and the cutting insert, which entails large bending strains upon the screw, which in turn results in that the latter is deformed at too strong a tightening. Furthermore, this construction is not wholly reliable at large cutting forces (i.e. at high feeds or laarge cutting depths), particularly not at large relief angles.

In U.S. Pat. No. 3,913,197, there is shown a locking screw, which is relatively severely angled in relation to the normal of the cutting insert, the screw head being brought to press against two diametrically opposed surfaces or points in the cutting insert hole. If the screw is somewhat untightened, the cutting insert can be removed. However, this construction is directly inappropriate for positive cutting inserts and is only adapted for cutting inserts whose side surfaces form straight angles to the cutting insert base surface (so called neutral or negative cutting inserts).

Further, in U.S. Pat. No. 4,430,031 a locking screw for cutting inserts is disclosed, the portion of the locking screw in the center hole of the cutting insert being eccentrically bent outwards and of a smaller cross-section than the hole's cross-section, whereby an untightening of the screw by about half a revolution enables a detaching of the cutting insert from the cutting insert seat. A drawback of this construction is that the operator may easily tighten the screw too strongly, so that the maximal radial bending-out of the screw head is exceeded and the head returns radially inwards, whereby the clamping becomes insufficient.

SUMMARY OF THE INVENTION

Thus, a primary object of the present invention is to provide a locking screw for cutting inserts, preferably for indexable cutting inserts for metal cutting machining, which does not need to be detached when replacing cutting inserts, and which gives a possibly evenly distributed clamping force against the cutting insert.

Another object of the present invention is to provide a locking screw for cutting inserts, which does not need to be detached when replacing cutting inserts, and which gives a strong and rigid clamping as well as a long tool life.

These and further objects have been solved in a surprising manner by forming the head of the locking screw as being chamfered at at least two places in order to enable the cutting insert to be threaded over the head of the locking screw, after the screw has been screwed upwards only a small number of revolutions, without being detached from the thread boring. The chamfers on the screw head include two opposed surface parts.

BRIEF DESCRIPTION OF THE DRAWINGS

For illustrative but non limiting purposes, the invention will now be further described with reference to the appended drawings. These are hereby briefly presented.

DETAILED DESCRIPTION OF THE PREFERRED EMBODIMENT

Figure 1:
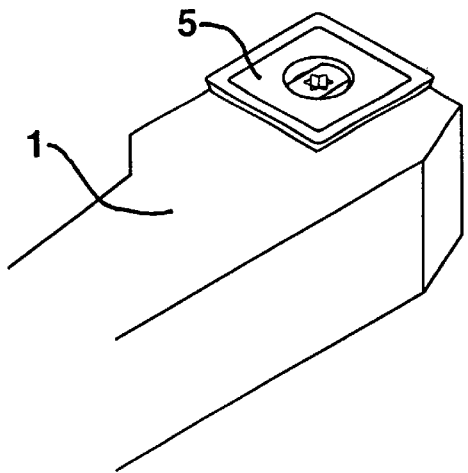
FIG. 1 shows an indexable insert which is clamped in a holder with a locking screw according to the invention.

In FIG. 1 a cutting insert holder body is designated by reference numeral 1, which in the illustrated embodiment is a turning bar. The invention is however generally applicable on all different types of cutting machining and can consequently also be applied for, e.g., milling and drilling. Thus, the cutting insert seat 2 exposed in FIG. 3 may even exist in for example a rotary milling cutter body and in the tip of a drilling tool.

Figure 3:
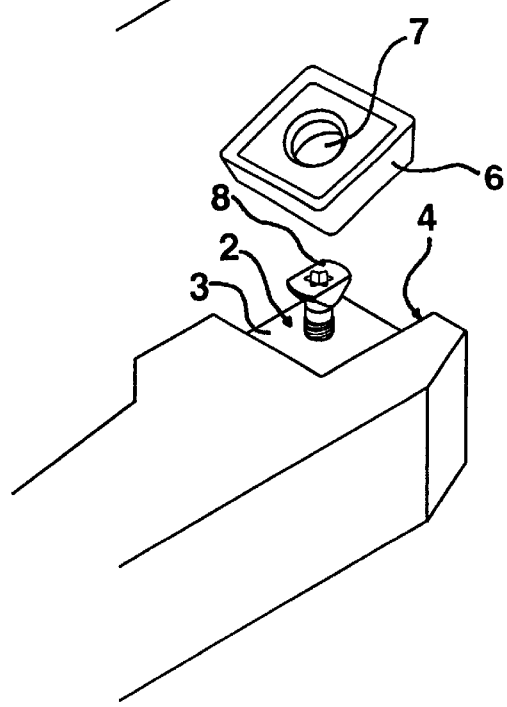
FIG. 3 shows how the cutting insert has been removed while the locking screw remains in the holder.

The cutting insert seat 2 of the operative end of the cutting insert holder body includes on one hand a planar bottom surface 3 and on the other hand abutment surfaces 4. Naturally, the cutting insert seat is adapted to the shape of the cutting insert 5 it is intended to accomodate. If the cutting insert is positive (i.e., their side or clearance surfaces 6 form an obtuse angle to the bottom surface of the cutting insert), then the abutment surfaces 4 can be shaped with a corresponding inclination, such as shown in FIG. 3. They can also be made with only their upper parts 4' (see FIG. 6) exhibiting a corresponding inclination towards the cutting insert, their lower parts 4" constituting free surfaces.

The shape and geometry of the cutting insert per se is not an important characteristic for the present invention. Thus, the cutting insert can exhibit a number of polygonic basic shapes; it may for instance be square, round, rectangular, triangular and hexagonal. Furthermore, it can be either neutral or positive. The essential feature of the insert that is specific for the present invention is that the cutting insert comprises a through hole 7 for the accomodation of an inserted locking screw 8, which is screwed into a threaded boring in the bottom surface 3.

Figure 4:
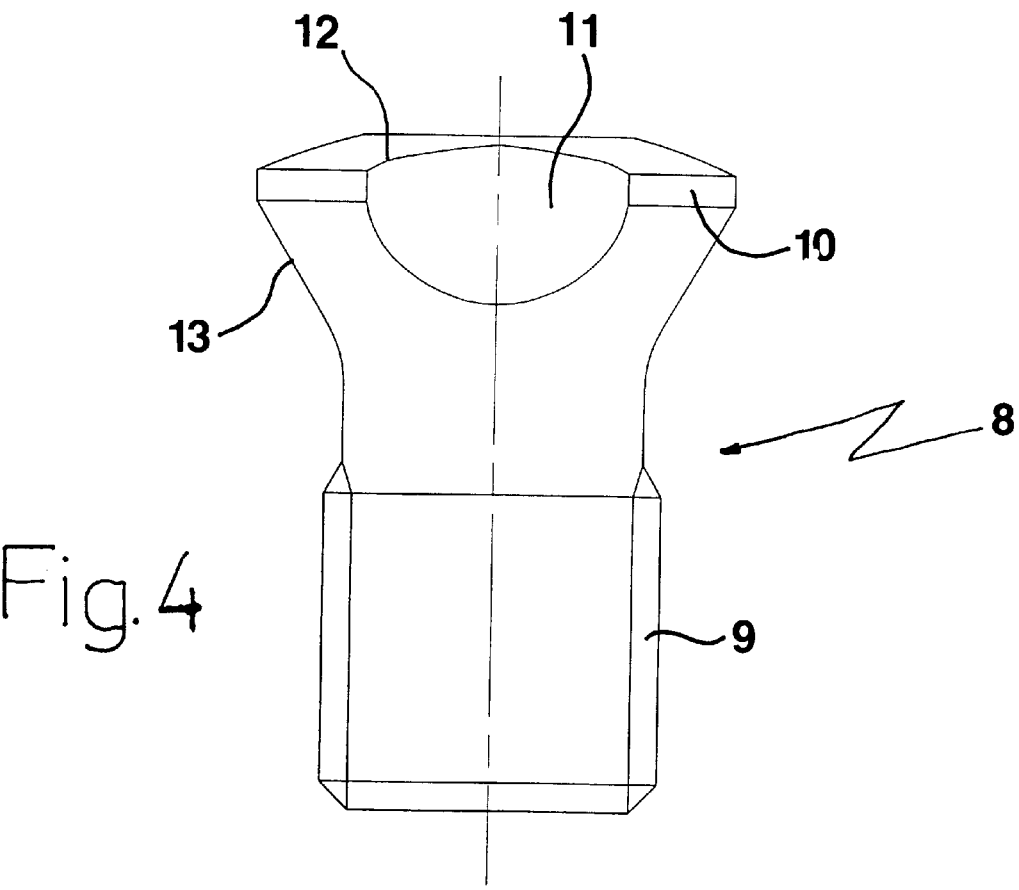
FIG. 4 shows a side view of a locking screw according to the invention.
Figure 7:
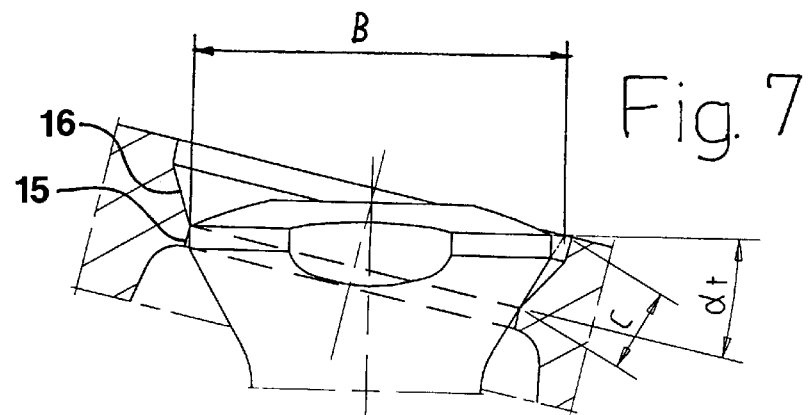
FIG. 7 shows a partial enlargement of FIG. 6.
Figure 8:
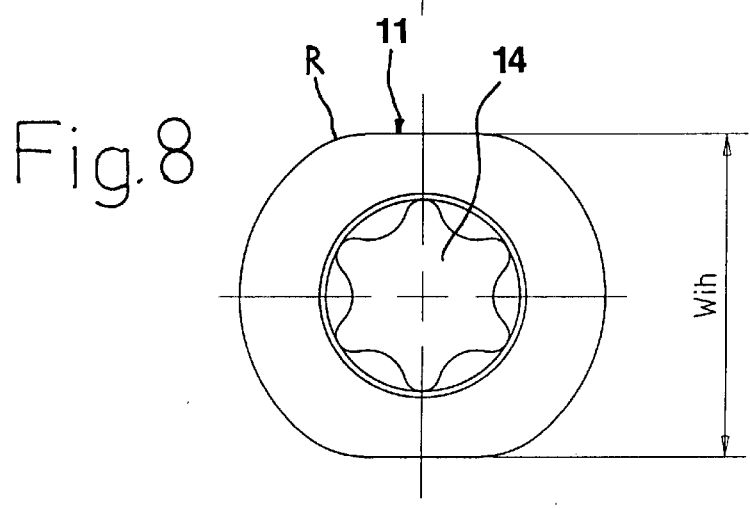
FIG. 8 shows a top view of the locking screw according to the invention.

The design of the locking screw 8 may be seen closer in FIGS. 4, 7 and 8. It includes substantially in the usual manner a cylindrical part 9, which is wholly or partly threaded, and a head 10. However, the characterizing feature in relation to usual locking screws is that two circle-segment-shaped sections in a radial plane of head 10 have been removed, whereby two substantially opposite chamfered surface parts 11 have been provided. These can for example extend in two essentially plane-parallel axial planes. The transition between a surface portion 11 and the remaining, rounded envelope surface of the head, can either be sharp over a break line 12, or be overbridged by a smooth radius R. The transition between the head of the screw and the cylindrical part can either be sharp, via a ring-shaped fillet, or take place over a reinforcing part 13, which substantially has the shape of a frusto-cone, cf. FIG. 4. Moreover, the top surface of the head is provided with a centrical indentation 14, whose cross-sectional shape is adapted to an appropriate turning tool. Usually, the indentation has the shape of a regular hexagon or a so called torx-shape, as shown in FIG. 7.

Figure 5:
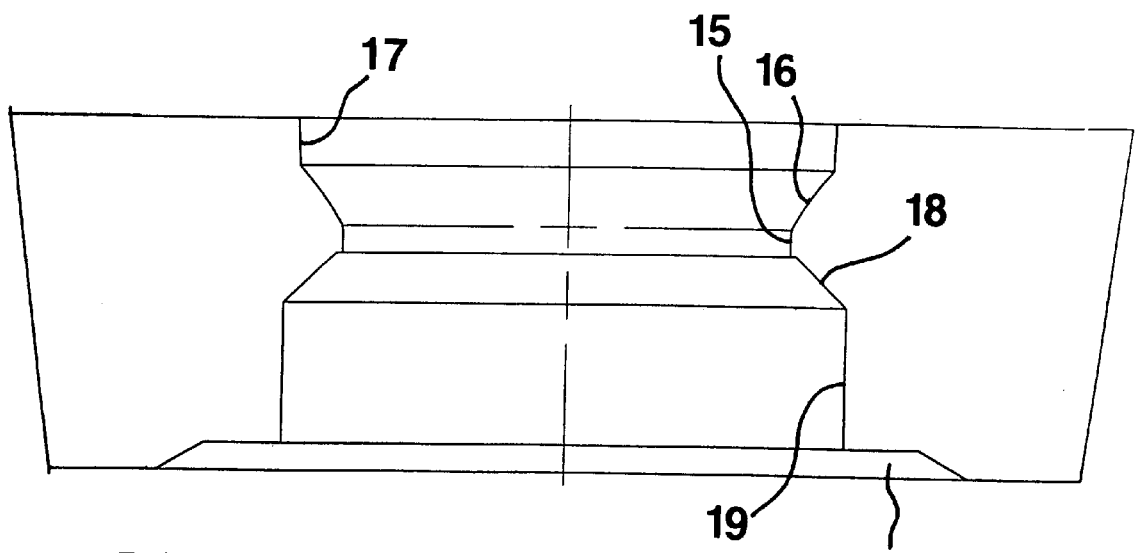
FIG. 5 shows a cross-section of a cutting insert according to the invention.
Figure 6:
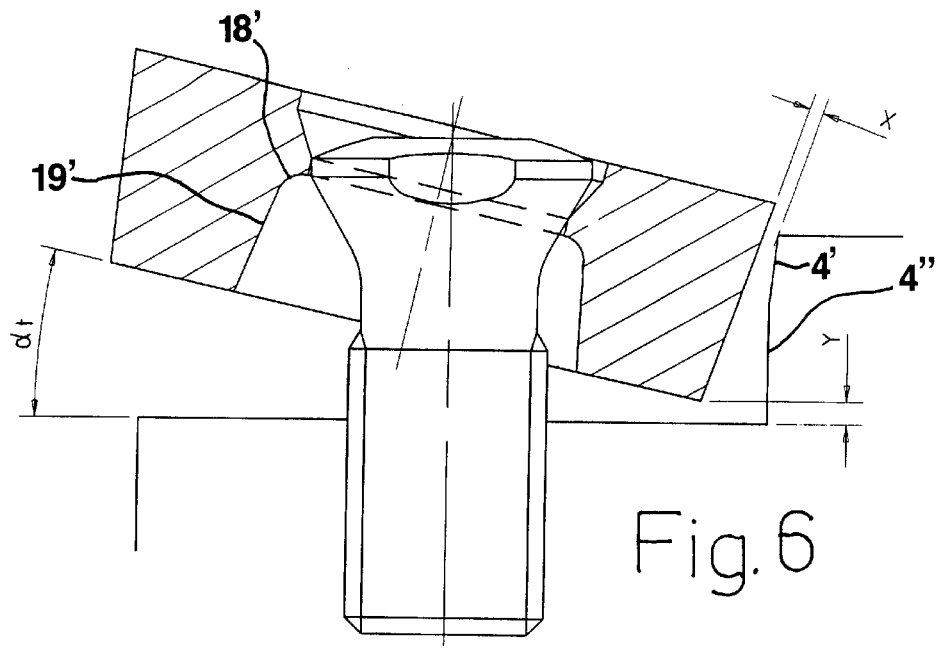
FIG. 6 shows how a cutting insert can be removed over the screw head according to the invention.

The hole geometry in the cutting insert must be adapted in a certain manner to be able to cooperate with the locking screw in the intended manner, as shown by FIG. 5 and FIG. 6. These two figures show two different possible embodiments of the cutting insert hole geometry. The essential feature for the hole geometry is that it has a narrow section or waist 15 with the hole's smallest diameter, the sections existing above and below said waist having larger diameters. The section 16 next above waist 15 has substantially the shape of a frusto-cone and is intended to function as an abutment for the screw's conical part 13. Preferably section 16 is shaped with a slightly convex radius (see FIG. 5), in order to give a distinct bearing against the screw. However, it may also be straight, as in FIG. 6 (and also 9). The essentially cylindrical hole section 17 is intended to countersink the screw head 10, so that the latter does not run the risk of disturbing the chip flow. According to FIG. 5, below the waist portion 15, there is provided a diameter increasing section 18, also substantially with the shape of a frusto-cone. This transposes underneath into an essentially cylindrical section 19. At the lower side of the cutting insert, a shallow recess 20 may be provided, whose primary object is to concede a distinct and statically well defined abutment between the lower side of the cutting insert and the bottom surface 3 of the cutting insert seat.

Figure 9:
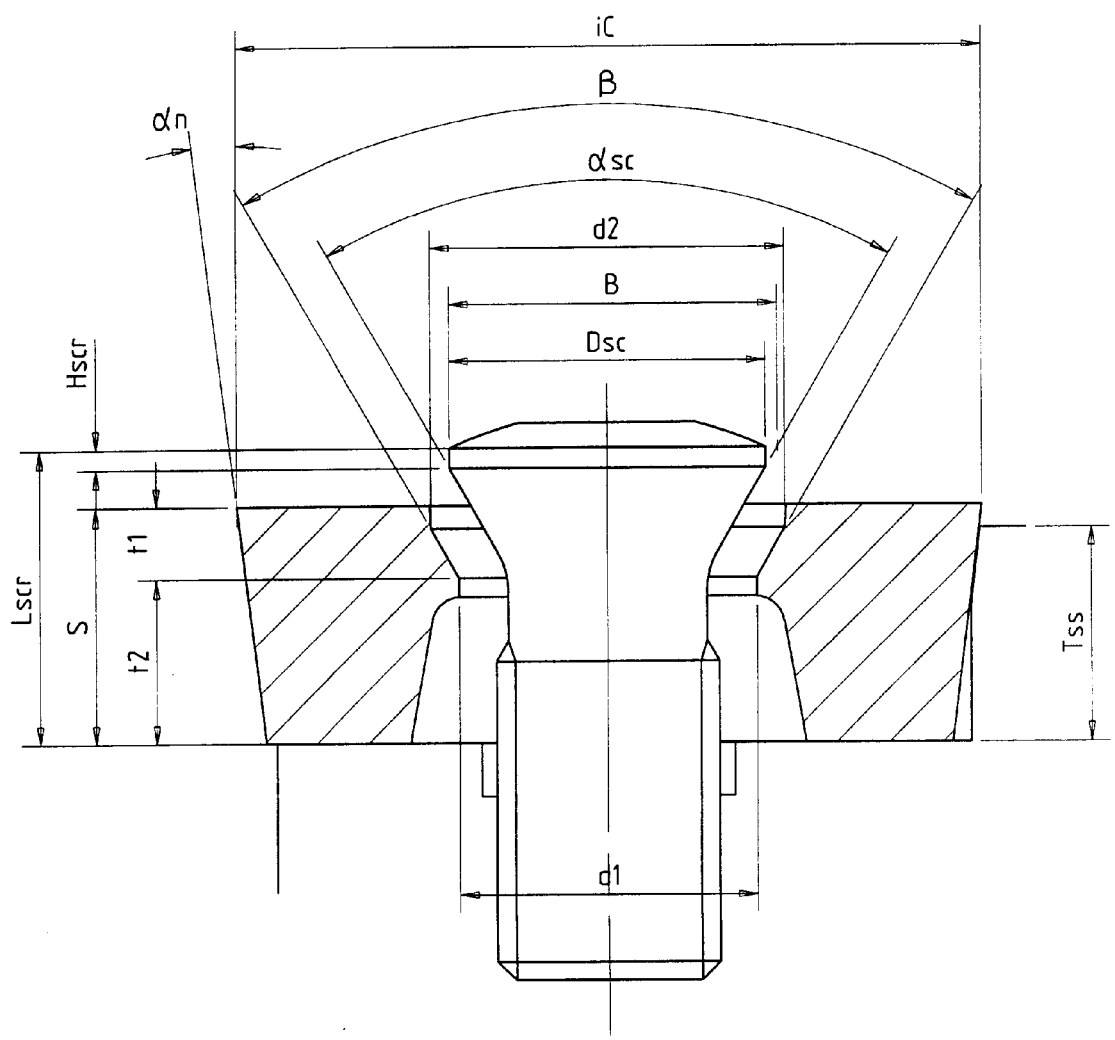
FIG. 9 illustrates the measures that are characteristic for the locking screw according to the invention.

For primarily press-technical reasons, the hole section underneath the waist portion may also be shaped in accordance with the FIGS. 6, 7 and 9. Hereby, said hole section essentially consists of a downwardly widening section 19' which substantially has the shape of a frusto-cone. Upwardly, this connects to the waist portion 15 via a radiussed transition 18'. In the illustrated case, the cone section 19' adjoins directly to the bottom side of the cutting insert, without any shallow recess 20.

Figure 2:
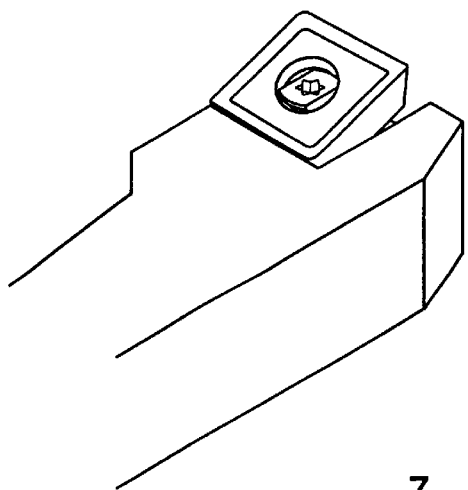
FIG. 2 shows how the indexable cutting insert can be tipped up when the locking screw is untightened by a few revolutions.

As shown in the FIGS. 2 and 6, it is possible by the provision of the screw surface parts 11, to step the cutting insert over the screw head 10, when the screw has been untightened a small number of revolutions. In FIG. 4 the different measures are indicated, which determine the necessary tipping angle $\alpha_t$ and the free gap X towards the support surfaces 4,4', as well as the free gap Y relative to the bottom surface 3. These are:

$L_{scr}$: The screwed-out height of the head relative to the bottom surface 3

$H_{scr}$: Height of of the head cylindrical envelope surface

S: Height of the cutting insert $t_1$: Height of the cutting insert above waist 15

$t_2$: Height of the cutting insert hole from the bottom side to the upper border line of waist 15

$\alpha_r$: The insert-specific clearance angle of the cutting insert iC: The "iC measure" of the cutting insert (i.e., the diameter of the maximal inscribed circle)

$\beta$: Upper cone angle of the cutting insert hole (cone angle of surface 16)

$\alpha_{sc}$: Cone angle of the screw head $d_1$: The smallest diameter of the cutting insert hole (diameter of the waist 15)

$d_2$: upper opening diameter of the cutting insert hole

B : The distance between a point on the cylinder-shaped peripherical surface of the screw head and the diametrically opposed intersection point of said point, between the extension of the head taper and the extension of the diameter through said point C: The distance between the above mentioned intersection point and a point on the head taper 13 constituting the intersection point between said taper and a line starting from the above mentioned point (see definition of B) which goes through the center axis of the screw and indicates the angle $\alpha_t$, with the angle apex in said point $D_{sc}$: diameter of the screw head $T_{ss}$: height of the support surface 4 (or 4'+4", respectively)

$W_{ih}$: the perpendicular distance between the surfaces 11 (FIG. 7)

The calculation of the required tipping angle $\alpha_t$, as well as the distances B and C is made according to the following:

$B = H_{scr} \cdot \tan(\alpha_{sc}/2) + D_{sc}$ $C = B/2 \pm \sqrt{[(B/2)^2 - (B^2 - d_1^2)]}$ $\alpha_t = \text{arc sinus}[C \cdot \sin(90 - \alpha_{sc}/2)/d_1]$ The smallest possible tipping angle $\alpha_t$ is endeavoured. As may be seen above, this angle is dependent on $D_{sc}$ and $d_1$ as well as on $H_{scr}$ and angle $\alpha_{sc}$. For example, $\alpha_{sc}$ is influenced favourably if the difference between $D_{sc}$ and $d_1$ is small, if $H_{scr}$ is small and/or if $\alpha_{sc}$ is large.

If for example $D_{sc} = 8.5$ mm, $d_1 = 8$ mm, $\alpha_{sc} = 60°$ and $H_{scr} = 0.544$ mm, then the following results are obtained:

B=8.814 mm
C=2.01 mm
$\alpha_t = 12.57°$

The calculation of the free gap X and Y, respectively, is made according to the following formula:

$$X = [(L_{scr} - T_{ss}) \cdot tg(\alpha_n + \alpha_t) + (IC/2 + D_{sc}/2 - (S - T_{ss}) \cdot tg\alpha_n)] \cdot$$
$$\cos(\alpha_n + \alpha_t) - (IC/2 + d_1/2 - t_1 tg\alpha_n) \cdot \cos\alpha_n$$

$$Y = L_{scr} - (IC/2 + d_1/2 - t_1 tg\alpha_n) \cdot \sin\alpha_t - t_2/\cos\alpha_n \cdot \cos(\alpha_n + \alpha_t)$$

Thus, the free gap between cutting insert and cutting insert seat is inter alia influenced by the number of revolutions by which the screw is threaded up ($L_{scr}$ is a function of the number of revolutions), the measure $T_{ss}$ and the clearance angle $\alpha_n$ of the cutting insert. With a given appearance of the cutting insert, it is the difference between $L_{scr}$ and $T_{ss}$ which can be influenced. Preferably, the relationship $L_{scr}/T_{ss}$ shall be as large as possible. Consequently, it is recommended to endeavour an increase in $L_{scr}$ and/or a reduction of $T_{ss}$.

If for example $L_{scr} = 7.92$ mm, $T_{ss} = 5.75$ mm, $\alpha_n = 7°$, $\alpha_t = 12.57°$, IC=20 mm, $D_{sc} = 8.5$ mm, S=6.35, $d_1 = 8$ mm, t=1.91 mm and $t_2 = 4.44$ mm, then is obtained a value for X of 0.42 mm and a value for Y of 0.71 mm.

If a neutral cutting insert is used, wherein the support surfaces 4 are wholly perpendicular to the bottom surface 3 (ie $\alpha_n = 0$), but the remaining values remain unaltered, then a X value of 0.39 mm and a Y value of 0.54 mm are obtained.

At the exemplified calculations, the screw has been threaded out by 2½ revolutions.

The angle β should preferably be less or the same as $\alpha_{sc}$.

Furthermore, $W_{ih}$ shall be less than $d_1$. $W_{ih}$ should not be so small that the screw is unnecessarily weakened but neither so large that the detaching of the cutting insert is made unnecessarily difficult. In itself, $W_{ih}$ can be the same as the diameter of the screw thread, but then the hole 14 should be diminished correspondingly. Suitably, the relationship $W_{ih}/d_1$ is between 0.60 and 0.95, preferably between 0.8 and 0.95.

With regard to $D_{sc}$ a suitable compromise is that $W_{ih}$ constitutes between 65 and 90% of $D_{sc}$, preferably between 70 and 80%.

Furthermore, the relationship $d_1/D_{sc}$ should not be so large that the detaching of the cutting insert is made unnecessarily difficult, but neither so small that the pressure-receiving overlapping between screw and cutting insert hole becomes insufficient. A suitable compromise is that the mentioned relationship lies between 0.80 and 0.97, preferably between 0.85 and 0.95.

Also the height position of the narrowest waist portion 15 in the cutting insert hole should be adapted in order to not necessitate an unnecessarily large diameter of the lower cylindric section 19 of the cutting insert hole. An appropriate relationship $t_2/S$ is 0.55 to 0.85, preferably 0.60 to 0.80. The diameter of the lower portion 19 should preferably be larger or the same as $d_2$.

The diameter $d_1$ of the waist portion 15 should be adapted to $d_2$ in order to give an optimal insert strength and an optimal clamping force, wherein these aspects must be balanced in relation to the detachability of the cutting insert from the locking screw. An appropriate relationship $d_1/d_2$ is 0.75–0.95, preferably 0.80 to 0.90.

The conical part 13 of the screw head should have a cone angle $\alpha_{sc}$ of between 50 and 180°, preferably between 50 and 90°. In any case, it should, as mentioned above, be larger than the cone angle β of the hole section 16.

The lower opening diameter of the hole section 19,19' should not be so large that it unnecessarily weakens the cutting insert, but on the other hand not too small, since it must allow for a sufficient gap when the cutting insert is tipped by an angle $\alpha_t$ when it is to be untightened.

Thus, by the present invention the substantial advantage has been achieved, that a clamping has been attained which is practically equivalent to that of a normal, rotation-symmetrical locking screw, but which does not need to be untightened by more than maximally four revolutions, generally between two and three revolutions, in order to remove the cutting insert. Furthermore, the screw and the cutting insert fit in already existent cutting insert seats, without necessitating any other alterations. A quick and simple mounting/demounting can be accomplished, without changing the direction of the clamping forces during the time of the mounting/demounting. In particular, the cutting insert remains in the seat, also when the screw has been detached.

The cutting insert as such is made of a hard material such as cemented carbide or different ceramics, in a way known per se. Generally, it is made of directly sintered cemented carbide, either coated or uncoated.

I claim:

1. A clamping arrangement, comprising a cutting insert for cutting machinery, and a substantially straight locking screw having a screw head, said screw being screwed into a threaded boring of a cutting insert seat intended for accommodating the cutting insert and fed through a through center hole in the cutting insert while angling the cutting insert with respect to the cutting insert seat, which cutting insert seat is provided in a cutting insert holder body, wherein the head of the locking screw is chamfered at at least two places in order to define at least two chamfers or grooves on an outer periphery of the head of the locking screw and thereby enable the cutting insert to be removably positioned over the head of the locking screw, after the screw has been screwed upwards a predetermined number of revolutions, without the screw being detached from the threaded boring, the chamfers or grooves on the screw head consisting of two opposed surface parts.

2. The clamping arrangement according to claim 1, wherein the chamfers on the screw head consist of two essentially plane-parallel, diametrically opposed surface parts.

3. The clamping arrangement according to claim 1, wherein the central through hole of the cutting insert has a waist portion, a lower side of the screw head pressing against an upper side of the waist portion when clamping the cutting insert into the cutting insert seat.

4. The clamping arrangement according to claim 1 wherein the cutting insert seat is provided in a turning bar.

5. The clamping arrangement according to claim 1 wherein the cutting insert seat is provided in a milling cutter body.

6. The clamping arrangement according to claim 1 wherein the cutting insert seat is provided in a drilling tool.

7. The clamping arrangement according to claim 1 wherein the predetermined number of revolutions is not more than four revolutions.

8. The clamping arrangement according to claim 7 wherein the predetermined number of revolutions is between two and three revolutions.

9. The clamping arrangement according to claim 1, wherein the chamfers are shaped as circular segments.

* * * * *